Oct. 13, 1959  J. A. MAYNARD ET AL  2,908,168
CONTROL APPARATUS
Filed Aug. 11, 1958  2 Sheets-Sheet 1

INVENTOR.
JOHN A. MAYNARD
SEYMOUR N. WASSERMAN
BY
Roger W. Jensen
ATTORNEY

Oct. 13, 1959  J. A. MAYNARD ET AL  2,908,168
CONTROL APPARATUS
Filed Aug. 11, 1958  2 Sheets-Sheet 2
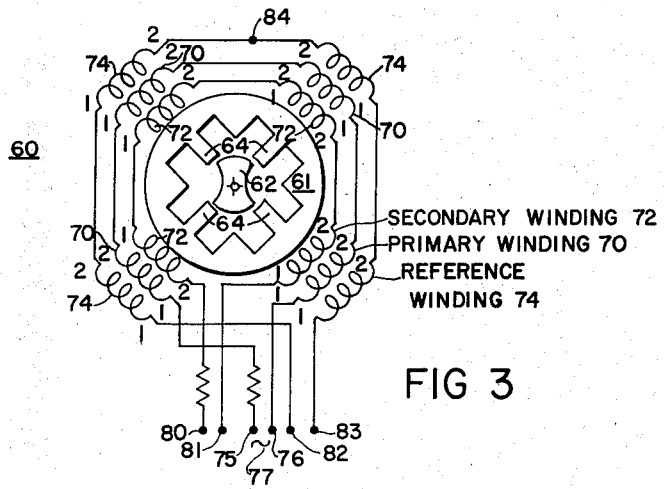
FIG 3
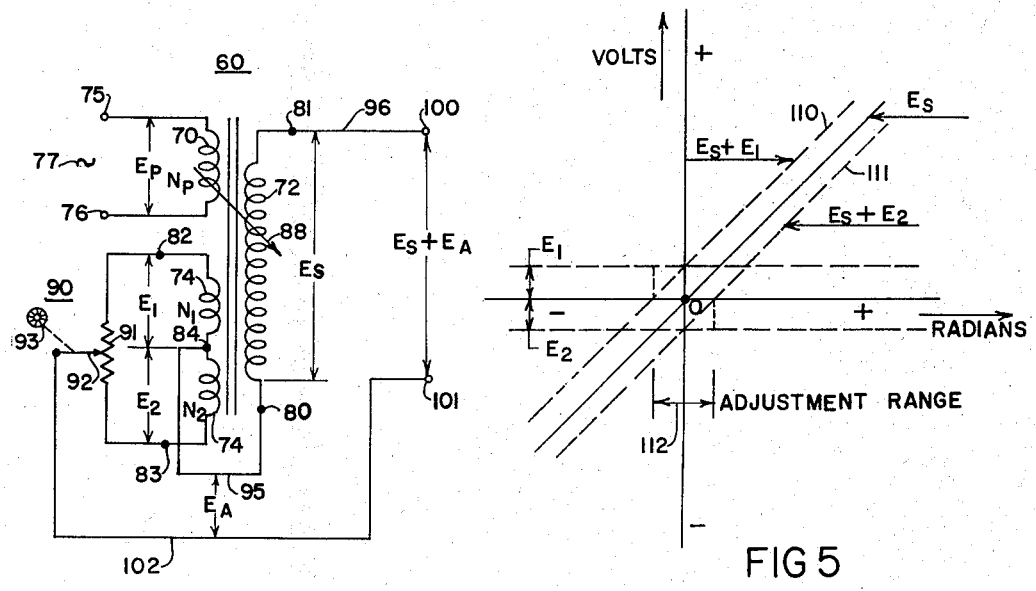
FIG 4
FIG 5
INVENTOR.
JOHN A. MAYNARD
SEYMOUR N. WASSERMAN
BY Roger W. Jensen
ATTORNEY

United States Patent Office 2,908,168
Patented Oct. 13, 1959

2,908,168

CONTROL APPARATUS

John A. Maynard, Winchester, and Seymour N. Wasserman, Natick, Mass., assignors to Minneapolis-Honeywell Regulator Company, Minneapolis, Minn., a corporation of Delaware Application August 11, 1958, Serial No. 754,381

5 Claims. (Cl. 74—5.6)

This invention is directed to control devices such as rate gyroscopes and accelerometers which broadly comprise a support, a sensitive instrument mounted on the support for movement relative thereto and resilient means connected between the support and the instrument which normally tends to maintain the instrument at a mechanical null position relative to the support in the absence of any input to the device. Signal generating means are provided in combination with the instrument so as to detect relative movement between the instrument and the support. Usually the signal generating means will have an output signal of one sense or the other relative to a null or zero signal depending upon the sense of relative movement between the support and the instrument and the signal further will be of a magnitude indicative of the magnitude of deviation between the support and the instrument.

In the type of control device broadly described a problem occurs in having the null signal of the signal generating means coinciding with the mechanical null position of the instrument relative to the support. Ideally the signal generating means will have a null signal when the device is at a mechanical null position. However, quite often when the instrument is at its mechanical null position, there will be a substantial signal developed by the signal generating means.

Heretofore various approaches have been taken to the matter of solving the problem of having the electrical null signal coincide with the mechanical null position. Generally the resilient centering means is not adjustable so that the signal producing means must be compensated in order to solve the problem. One of the prior art approaches is to use a magnetic shunt or slug associated with an inductive pickoff, the shunt or slug being adjusted relative to the magnetic core structure so as to shift the null signal point so that it coincides with the mechanical null position of the relatively movable parts of the instrument. However, this prior art approach cannot be used in all cases due to various factors, such as space limitations, accessibility of adjusting means, etc.

The present invention is directed to a means of shifting the electrical null signal produced by a signal generating means on an instrument of the broad type described above so that the electrical null signal will coincide exactly with the mechanical null position of the relatively movable parts of the apparatus, the means of the present invention having several distinct advantages over the prior art methods.

The present invention involves the shifting of the electrical null signal produced by an inductive pickoff associated with a sensitive instrument, the inductive pickoff generally comprising an armature and a stator having a primary winding and a secondary winding, the compensating means including a reference winding inductively coupled with the primary winding so as to have a voltage developed therein which is a function of the current flowing in the primary winding only and which is not affected by relative movement between the relatively movable parts of the signal generating means. Means are provided to obtain a signal from the reference winding means of variable magnitude and reversible phase, this reference voltage being summed together with the signal developed in the secondary winding, the combined signal being applied to the output of the device. In this manner the output signal can be adjusted if desired remote from the control device so as to adjust the electrical output of the device to a null value when no input is being applied to the device, i.e., making the electrical null signal coincide with the mechanical null position of the relatively movable parts of the instrumentality.

It is an object therefore of my invention to provide an improved control apparatus.

Another object of this invention is to provide a means of adjusting the electrical output signal from a control device so that the null signal coincides with the mechanical null position of the movable parts of the device.

These and other objects of the invention will become apparent from a reading of the following specification and appended claims, in conjunction with the accompanying drawings in which:

Figure 3 is a schematic showing of the signal generating means shown in Figures 1 and 2;

Figure 4 is a complete schematic wiring diagram of the compensated pickoff showing the interconnection means between the reference winding and secondary winding; and Figure 5 is a graphical representation of the relationship between the rotation between the armature and stator means and the voltage developed at the output of the signal generating means.

Figure 1:
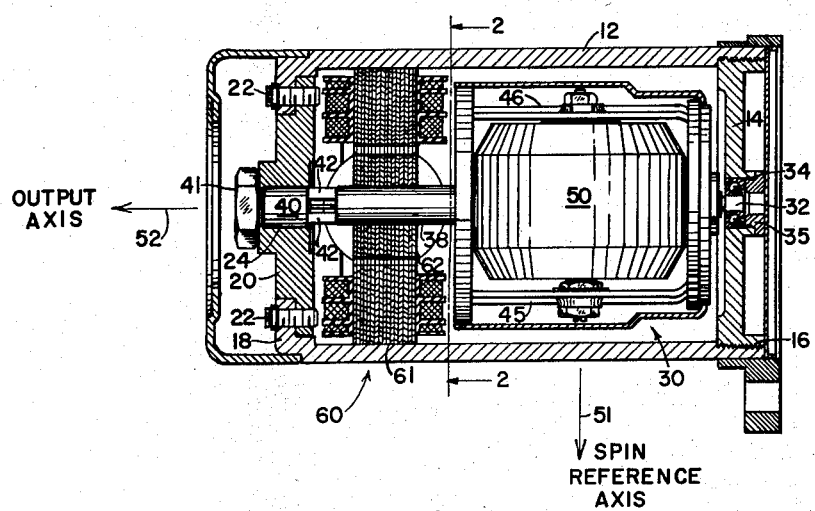
Figure 1 is a cross-sectional view of a spring restrained rate gyroscope including an inductive pickoff or signal generating means.

Referring to Figure 1 reference numeral 10 denotes a control device in the form of a rate of turn gyroscope comprising a main hollow cylindrical housing or support 12 the right end of which as shown in Figure 1 is closed off by a bearing support 14 secured to housing 12 by any suitable means such as threads 16. An annular flange 18 is provided near the left extremity of housing 12 as shown in Figure 1 and a gimbal mounting means 20 is fitted against flange 18 and secured thereto by suitable means such as machine screws 22. Gimbal mounting means 20 generally has a circular configuration and is provided with a central aperture 24.

Reference numeral 30 denotes a sensitive instrument in the form of gimbal assembly mounted within the support or housing 12 and which includes a gudgeon pin 32 at the right extremity thereof as shown in Figure 1 which fits into the inner race of a bearing means 34, the outer race of which fits securely into a central aperture in the bearing support plate 14 of the housing. A suitable bearing retainer 35 holds the bearing means 34 relative to the support plate 14. The gimbal assembly 30 further includes a shaft portion 38, the axis of which is generally aligned with the rotational axis of bearing means 34. A shorter shaft portion 40 is adapted to be fitted into the central aperture 24 in the gimbal mounting member 20 and is secured thereto by suitable means such as nut member 41. A plurality of flat longitudinally extending torsion spring members 42 resiliently connect shaft portions 38 and 40 and are secured thereto by suitable means such as brazing, etc. In another variation of the resilient centering means for gimbal 30 the shaft portions 38 and 40 as well as torsion spring means 42 can all be fabricated out of the same piece of stock by having the spring means 42 defined by a machining process.

The gimbal assembly 30 further includes a pair of spin motor supports 45 and 46 upon which is mounted a spin motor assembly including a rotor member 50. Means not specifically shown are provided for imparting a rotation to the rotor member 50 for rotation about a spin reference axis generally depicted in Figure 1 by the arrow 51. It will be understood that the bearing means 34 and the resilient means 42 define a rotational or output axis for the gimbal assembly 30, the output axis being designated in Figure 1 by the arrow 52. It will be further understood that the rate gyroscope 10 will have an input axis identified in Figure 2 by the arrow 53 substantially perpendicular to both the spin reference axis 51 and the output axis 52, the device responding to rotation about the input axis in the well known manner so as to cause the gimbal assembly 30 to rotate about its output axis as a function of the rate of rotation about the input axis.

Figure 2:
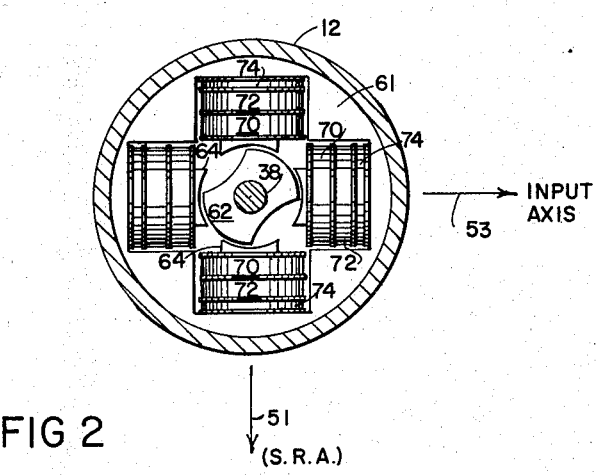
Figure 2 is a side view of the pickoff means of the device in Figure 1 as viewed along section lines 2—2 of Figure 1.

Means are provided for sensing the rotation of the gimbal assembly 30 about the output axis 52, the means shown being in the form of an inductive pickoff generally known in the art as a Microsyn. The signal generating means is generally identified in Figure 1 by the reference numeral 60 and generally comprising a stator member 61 and an armature or rotor member 62. Stator member 61 has a generally circular outer periphery adapted to fit snugly into the inside of the housing 12 and is adapted to be secured thereto by suitable means, not shown. The stator member includes a plurality of inwardly extending pole members 64 which terminate in arcuate pole faces collectively defining a generally circular opening in which the rotor member 62 is positioned. The rotor member 62 is securely fastened to the shaft portion 38 of the gimbal assembly 30 so as to rotate therewith about the output axis 52 in response to inputs about the gyro's input axis 53. As shown in Figure 2 the rotor or armature portions 62 of the signal generating means is a generally bipolar member having a principal axis which lies intermediate the polar extensions 64 of the stator member 61. For further reference and details pertaining to this general type of signal generating means, reference may be made to the Mueller Patent 2,488,734 which issued November 22, 1949.

A plurality of coil means are provided on each of the poles 64 of the stator member 61. These coil means include a primary winding means 70, a secondary winding means 72, and a reference winding means 74.

The signal generating means 60 is shown schematically in Figure 3 wherein the individual windings on the polar extremities 64 of stator member 61 are shown outside of the stator 61 for convenience. It will be observed that each of the polar extremities 64 has associated therewith a primary winding 70, a secondary winding 72, and a reference winding 74. It will be further observed that each of the windings schematically depicted has associated therewith the numbers 1 and 2. These are placed for purposes of determining the winding sense of the winding around the polar extremities in the same manner as is shown in the Mueller patent. It will be observed that the winding sense of the reference winding 74 on each polar extremity 64 is identical to the winding sense of the primary winding means 70. It will be further noted that the secondary winding 72 on some of the polar extremities will have the same winding sense as the primary winding means 70 but on other polar extremities will have the opposite winding sense. This is but one of several ways of connecting the windings on this type of signal generating device, the main requirement being that an output voltage be developed in the secondary windings 72 which is a function of the energization to the primary winding means 70 and is also a function of relative rotation between the armature or rotor member 62 and the stator member 61. The primary windings 70 are all connected together in series by suitable connection means and terminate in a pair of terminals 75 and 76 adapted to be connected to a suitable source of alternating current 77. It will be understood that an alternating current signal will be induced in the secondary winding 72 which is a function of the magnitude of the energization on the primary winding 70 as well as a function of the relative rotation between rotor or armature member 62 and the stator member 61. The secondary windings 72 are connected together in series and terminate in a pair of terminals 80 and 81 as shown in Figure 3. The reference windings 74 are likewise connected together in series and terminate in a pair of terminals 82 and 83 as shown in Figure 3. It will be understood that since the reference winding 74 is wound in the same sense as the primary winding 70 around each of the polar extremities 64 of the stator 61 that the reference winding will have induced therein a voltage which is a function of the energization to the primary winding only and which will not be affected by the rotation of the armature 62 relative to the stator 61.

The voltages developed at terminals 80 and 81 of the secondary windings and at terminals 82 and 83 of the reference windings are either in phase with one another or are 180° out of phase depending upon the sense of measuring of voltage because they are a result of the same primary flux.

The reference winding 74, in addition to having output terminals 82 and 83, has a center tap terminal 84.

The signal generating means 60 with the interconnection means between the reference winding 74 and secondary winding 72 is shown in Figure 4. For simplification purposes the four primary windings 70 have been shown in Figure 4 as a single winding 70 terminating in terminals 75 and 76 energized by the source of alternating current 77. Also for purposes of simplification the four secondary windings 72 have been shown as a single winding 72 terminating in terminals 80 and 81. An arrow 88 linking the primary winding 70 and the secondary winding 72 denotes the variable coupling therebetween which is a function of the relative rotation between the rotor or armature member 62 and the stator member 61. The reference winding means 74 on the stator 61 have been depicted in Figure 4 as two separate coil groups N1 and N2, coil N1 having its ends terminating at junction or terminal points 82 and 84 and the section N2 terminating at points 83 and 84. A potentiometer 90 is provided in combination with the reference winding means 74 to form a bridge so as to provide a means for combining the signal from the reference winding with that from the secondary winding. More specifically the potentiometer 90 includes a resistive portion 91 having its end connected to terminals 82 and 83 of the reference winding means and a wiper portion 92. A suitable means 93 is provided for adjusting the wiper member 92 relative to the resistive portion 91 of the potentiometer 90. It will be understood that wiper 92 of the potentiometer may be adjusted so that there is no difference in potential between it and the junction point 84 on a reference winding 74. It will be further understood that potentiometer 92 may be varied in either direction away from the zero signal position so that a difference in potential will be developed between the wiper 92 and the junction point 84 of reversible phase and of a magnitude depending upon the degree of deviation away from the starting point. A suitable lead 95 connects junction point 84 on the reference winding means 74 to terminal 80 of the secondary winding 72. Another suitable lead member 96 connects the other terminal 81 of the secondary winding 72 to a first output terminal 100, a second output terminal 101 being connected to the wiper 92 through a lead member 102. From the arrangement described it will be understood that the total signal appearing between output terminals 100 and 101 will be the summation of the voltage appearing across the secondary winding 72 which is designated in Figure 4 as $E_s$ plus the voltage developed between wiper 92 and junction point 84 on the reference winding 74 and which is designated as $E_A$. The voltage available between junction point 84 and terminal 82 of the reference winding means 74 is depicted in Figure 4 by the reference $E_1$ while the voltage available between junction point 84 and terminal 83 of the reference winding means 74 in Figure 4 is identified by the reference $E_2$. It will be appreciated that if wiper member 92 were adjusted to the maximum upward position as shown in Figure 4 that the potential difference $E_A$ between wiper 92 and junction point 84 would be equal to the value of $E_1$ and further that if the wiper member 92 were adjusted to its lowest position as shown in Figure 4 that a potential difference $E_A$ of the magnitude of $E_2$ would be developed between the wiper 92 and the junction point 84. This variation in the total output signal $E_s+E_A$ appearing between output terminals 100 and 101 is depicted graphically in Figure 5 which shows a plot of voltage vs. radians or in other words is a measure of the voltage developed as a function of rotation of the rotor member 62 relative to the stator member 61 of the signal generating means 60. The basic voltage $E_s$ developed in the secondary winding 72 is shown by the solid line $E_s$ in the graph of Figure 5 which is essentially a straight line passing through the origin O. Relative polarities plus and minus have been applied to the voltage scale and positive and negative senses of rotation have been designated on the rotation scale by plus and minus signs. It will be observed that for a positive sense of rotation there will be a positive sense of signal developed in the secondary winding 72 and conversely for a negative sense of rotation there will be a negative sense of signal developed in secondary winding 72. It will be understood, of course, that the signal developed in secondary winding 72 is of an alternating nature and that the graphical presentation in Figure 5 is based upon instantaneous values. The reference voltages $E_1$ and $E_2$ are depicted graphically in Figure 5, reference voltage $E_1$ being of a positive sense while reference voltage $E_2$ is of a negative sense. It will be understood that if the wiper member 92 of potentiometer 90 is adjusted so that all of voltage $E_1$ is added to the secondary voltage $E_s$ that a resultant voltage of $E_s+E_1$ depicted by the line 110 in Figure 5 will be produced while the other extreme would be to have wiper member 92 positioned so as to combine the maximum value of $E_2$ with the voltage $E_s$ of the secondary winding 72 so as to produce a resultant signal of $E_s+E_2$ which is depicted in Figure 5 by the line 111.

The intersection of lines 110 and 111 with the abscissa thus is a measure of the total adjustment range 112 available in the device.

*Operation*

It will be appreciated that in the construction of the rate gyroscope 10 that the resilient means 42 which restrain the gimbal assembly 30 from rotation about the output axis 52 will tend to give the gimbal assembly 30 a mechanical null position relative to the support or housing 12 in the absence of any input about the gyro input axis. Ideally the signal developed in the secondary winding $E_s$ when the gimbal is at its mechanical null position will be zero and the solid line $E_s$ on Figure 5 would pass through the origin O as shown. However, in actual practice it is usually found that there is a finite signal developed in the secondary winding at this time. The adjustment means provided herein are then utilized by connecting a suitable voltage sensing means to the output terminals 100 and 101 and then adjusting the wiper 92 relative to the resistive portion 91 of potentiometer 90 by the adjustment means 93 until the voltage at the output terminals 100 and 101 is reduced to a minimum. It will be appreciated that the potentiometer 90 may be remotely located from the gyroscope 10 if desired or may be attached thereto by suitable means, according to choice. The adjustment range 112 is determined by the magnitude of the voltages $E_1$ and $E_2$ and is selected according to the amount of possible deviation between the mechanical null position of the gimbal 30 relative to the case 12 and the electrical null signal.

The present invention has been shown in combination with a rate gyroscope 10 comprising a support and a sensitive means mounted on the support for movement relative thereto. It will be understood that the present invention may be applied to other types of sensitive instruments such as accelerometers comprising in part a support and a sensitive instrumentality mounted thereon for movement and including an inductive pickoff comprising in part a primary winding and a secondary winding, the accelerometer having means which normally restrain the movable part relative to the support. The present invention may be applied in the same manner as is depicted therein with the rate gyroscope 10 in the sense that a reference winding may be provided together with means such as the potentiometer 90 for producing a reference voltage of reversible phase and variable magnitude which may be summed together with the voltage induced in the secondary winding $E_s$ so that the resultant signal produced at the output terminals will be at a null when the control instrumentality is at a mechanical null position.

In some applications it may be desirable to assemble the sensitive instrument so that the null deviation is always in the same direction. In this case it is not necessary to connect point 80 to point 84 as shown in Figure 4. Instead, point 80 may be connected to point 83. With this arrangement the entire voltage $E_1+E_2$ induced in the reference winding is available to combine with the secondary voltage $E_s$.

In actual practice it may be desired to replace the potentiometer 91 by two fixed resistors of the proper ratio once the proper ratio is determined. This is desirable in some applications to improve the shock, vibration, and humidity characteristics of the apparatus.

While we have shown and described a specific embodiment of this invention, further modifications and improvements will occur to those skilled in the art. We desire it to be understood therefore, that this invention is not limited to the particular form shown and we intend in the appended claims to cover all modifications which do not depart from the spirit and scope of this invention.

What we claim is:

1. In apparatus of the class described: a support; a sensitive instrument; means mounting said instrument on said support, said mounting means permitting relative movement between said instrument and said support; resilient means connected to said support and to said instrument and adapted to center said instrument to a mechanical null position relative to said support; pickoff means for producing a signal indicative of relative movement between said instrument and said support, said pickoff means comprising a multipole stator structure mounted on said support, an armature member on said instrument, primary winding means on said stator adapted to be connected to an alternating voltage, secondary winding means on said stator adapted to have induced therein an alternating voltage as a function of the magnitude of the voltage applied to said primary winding means and of the relative position of said stator and said armature; and means for adjusting the output of said pickoff means to a null value when said instrument is at said mechanical null position relative to said support, said adjusting means comprising reference winding means on said stator means and magnetically coupled to said primary winding means so as to have induced therein an alternating voltage which is a function of the magnitude of the voltage applied to said primary winding means and which is independent of the relative position of said stator and said armature, and means including bridge means connecting said reference winding means to said secondary winding means for summing with the voltage induced in said secondary winding means a reference voltage of adjustable magnitude and phase relationship.

2. In apparatus of the class described: a support; a sensitive instrument; means mounting said instrument on said support, said mounting means permitting relative rotation between said instrument and said support; spring means connected to said support and to said instrument and adapted to position said instrument to a mechanical null position relative to said support; pickoff means for producing a signal indicative of relative rotation between said instrument and said support, said pickoff means comprising a multipole stator structure mounted on said support, a rotor member connected to said instrument, primary winding means on said stator adapted to be connected to an alternating voltage, secondary winding means on said stator adapted to have induced therein an alternating voltage as a function of the magnitude of the voltage applied to said primary winding means and of the relative position of said stator and said armature; and means for adjusting the output of said pickoff means to a null value when said instrument is at said mechanical null position relative to said support, said adjusting means comprising reference winding means on said stator means and magnetically coupled to said primary winding means so as to have induced therein an alternating voltage which is a function of the magnitude of the voltage applied to said primary winding means and which is independent of the relative position of said stator and said armature, and means including potentiometer means connecting said reference winding means to said secondary winding means for summing with the voltage induced in said secondary winding means a reference voltage of adjustable magnitude and reversible phase.

3. In apparatus of the class described: a support; a sensitive instrument; means mounting said instrument on said support for relative movement therebetween; yieldable means connected to said support and to said instrument and adapted to position said instrument to a mechanical null position relative to said support; pickoff means for producing a signal indicative of relative movement between said instrument and said support, said pickoff means comprising stator means, armature means, means connecting said stator means and said armature means to said instrument and to said support so that there is relative movement between said stator means and said rotor means when relative motion occurs between said support and said instrument, primary winding means on said stator means adapted to have connected thereto an alternating voltage, output means including secondary winding means on said stator means adapted to have induced therein an alternating voltage as a function of the magnitude of the voltage applied to said primary winding means and of the relative position of said stator means and said armature means; and means for adjusting the output of said pickoff means to a null value when said instrument is at said mechanical null position relative to said support, said adjusting means comprising means for providing a reference voltage of reversible phase and variable magnitude, and means connecting said reversible phase and variable magnitude voltage providing means to said secondary winding means for summing said reference voltage with the voltage induced in said secondary winding means.

4. In apparatus of the class described: a support; a sensitive instrument; means mounting said instrument on said support, said mounting means permitting relative movement between said instrument and said support; means connected to said support and to said instrument and adapted to position said instrument to a mechanical null position relative to said support; pickoff means for producing a signal indicative of relative displacement between said instrument and said support, said pickoff means comprising stator means, armature means, means connecting said stator means and said armature means to said instrument and to said support, primary winding means on said stator means adapted to be connected to an alternating voltage, secondary winding means on said stator means adapted to have induced therein an alternating voltage as a function of the magnitude of the voltage applied to said primary winding means and of the relative position of said stator and said armature; and means for adjusting the output of said pickoff means to a null value when said instrument is at said mechanical null position relative to said support, said adjusting means comprising reference means adapted to have developed thereon an alternating voltage which is a function of the voltage applied to said primary winding means and which is independent of the relative position of said stator and said armature, and circuit means connecting said reference means to said secondary winding means for summing a reference voltage with the voltage induced in said secondary winding means.

5. In apparatus of the class described: a support; an instrument movably mounted on said support; means connected to said support and to said instrument and adapted to position said instrument to a mechanical null position relative to said support; means for producing a signal indicative of relative movement between said instrument and said support, said signal producing means comprising stator means, armature means, means connecting said stator means and said armature means to said instrument and to said support, means on said stator means adapted to be connected to a voltage, signal means adapted to have developed therein a signal voltage as a function of the magnitude of the voltage applied to said means on said stator means and of the relative position of said stator means and said armature means; and means for adjusting the output of said signal producing means to a null value when said instrument is at said mechanical null position relative to said support, said adjusting means comprising reference means adapted to have developed thereon a reference voltage of reversible sense and variable magnitude, and means connecting said reference means to said signal means for combining the reference voltage with the signal voltage.

References Cited in the file of this patent
UNITED STATES PATENTS

| | | |
|---|---|---|
| 2,592,417 | Hale | Apr. 8, 1952 |
| 2,715,709 | Schoeppel | Aug. 16, 1955 |